(12) United States Patent
Fink et al.

(10) Patent No.: US 8,362,897 B2
(45) Date of Patent: Jan. 29, 2013

(54) METHOD AND DEVICE FOR LOCATING TIRES MOUNTED ON A VEHICLE

(75) Inventors: Alexander Fink, Regensburg (DE); Frank Fischer, Regensburg (DE); Gregor Kuchler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 842 days.

(21) Appl. No.: 12/526,559

(22) PCT Filed: Feb. 6, 2008

(86) PCT No.: PCT/EP2008/051457
§ 371 (c)(1), (2), (4) Date: Aug. 10, 2009

(87) PCT Pub. No.: WO2008/095959
PCT Pub. Date: Aug. 14, 2008

(65) Prior Publication Data
US 2010/0026483 A1 Feb. 4, 2010

(30) Foreign Application Priority Data
Feb. 9, 2007 (DE) .......................... 10 2007 007 200

(51) Int. Cl.
*G08B 1/08* (2006.01)
*B60C 23/00* (2006.01)
*G01L 3/00* (2006.01)
(52) U.S. Cl. ..................... 340/539.1; 340/445; 340/447; 73/114.25
(58) Field of Classification Search ............... 340/539.1, 340/445, 447; 73/114.25
See application file for complete search history.

(56) References Cited

U.S. PATENT DOCUMENTS
2004/0113765 A1* 6/2004 Suitsu ........................ 340/445
(Continued)

FOREIGN PATENT DOCUMENTS
DE 10238571 A1 3/2004
DE 10302383 A1 8/2004
(Continued)

OTHER PUBLICATIONS
German Office Action dated Jan. 7, 2007.
International Search Report dated May 27, 2008.

*Primary Examiner* — George Bugg
*Assistant Examiner* — Jack K Wang
(74) *Attorney, Agent, or Firm* — Laurence A. Greenberg; Werner H. Stemer; Ralph E. Locher

(57) ABSTRACT

A method and a device for locating tires mounted on a vehicle. High frequency signals are captured by way of a first transmit/receive device arranged on a vehicle, said high-frequency signals originating from a wheel electronic system arranged on the vehicle, said wheel electronic system interacting with tires of a first tire group that are mounted on the vehicle. A trigger signal having a frequency that is clearly lower than the frequency of the high frequency signal, is emitted by the first transmit/receive device. The first transmit/receive device is arranged on the vehicle in such a manner that the tires of the first tire group are mounted on the vehicle and the level of the first trigger signal is selected in such a manner that only one part of the wheel electronic system, which is associated with the tires of the first tire group, captures the first trigger signal and the high frequency signals which originate from the part of the wheel electronic system of the tires of the first wheel group that has captured the first trigger signal, contains information on the obtained first trigger signal.

14 Claims, 3 Drawing Sheets

U.S. PATENT DOCUMENTS

| | | |
|---|---|---|
| 2006/0001535 A1 | 1/2006 | Hafele et al. |
| 2008/0157954 A1* | 7/2008 | Tsuchida ............ 340/445 |
| 2008/0196492 A1 | 8/2008 | Achterjholt |
| 2008/0272900 A1 | 11/2008 | Schillinger et al. |
| 2009/0021363 A1 | 1/2009 | Heise et al. |
| 2009/0184814 A1* | 7/2009 | Lee et al. ............ 340/447 |
| 2009/0204286 A1* | 8/2009 | Costes ............... 701/29 |
| 2010/0024939 A1* | 2/2010 | Kusunoki et al. ....... 152/416 |

FOREIGN PATENT DOCUMENTS

| | | |
|---|---|---|
| DE | 102006012353 A1 | 10/2006 |
| DE | 102006012534 A1 | 10/2006 |
| DE | 102005026974 A1 | 1/2007 |
| EP | 1621366 A1 | 2/2006 |
| WO | 2005101685 A1 | 10/2005 |

\* cited by examiner

METHOD AND DEVICE FOR LOCATING TIRES MOUNTED ON A VEHICLE

BACKGROUND OF THE INVENTION

Field of the Invention

The invention relates to a method and apparatus for locating tires mounted on a vehicle.

Some vehicles are fitted with an apparatus for automatic tire pressure monitoring for the tires of the vehicle. The tires of the vehicle interact with wheel electronic systems, which are disposed for example on the rims for the tires or can even be integrated in the tires. The wheel electronic systems for example measure the tire pressure of their tire automatically and transmit information about the tire pressure wirelessly to a receiver disposed in the vehicle. An evaluation apparatus disposed in the vehicle can compare the tire pressures transmitted to the receiver with threshold values for example and inform a person steering the vehicle as required if one of the tires has too low a tire pressure.

To configure the automatic tire pressure monitoring so that it is more user-friendly for the person steering the vehicle, it is desirable for said person also to be informed as required about the mounting location of a tire with too low a tire pressure. To this end the evaluation apparatus also requires information about the mounting location of the relevant tire.

BRIEF SUMMARY OF THE INVENTION

The object of the invention is therefore to specify an improved and relatively user-friendly method for locating tires mounted on a vehicle.

A further object of the invention is to specify a corresponding apparatus for locating tires mounted on a vehicle.

The object of the invention is achieved by a method for locating tires mounted on a vehicle, having the following method steps: using a first transmit/receive apparatus disposed on a vehicle to receive high-frequency signals originating from wheel electronic systems disposed on the vehicle, said wheel electronic systems interacting with tires of a first tire set mounted on the vehicle and using the first transmit/receive apparatus to transmit a first trigger signal, which has a frequency which is significantly lower than the frequency of the high-frequency signals, the first transmit/receive apparatus being disposed on the vehicle in such a manner, the tires of the first tire set being mounted on the vehicle in such a manner and the level of the first trigger signal being selected in such a manner that only one part of the wheel electronic systems, which are associated with the tires of the first tire set, receives the first trigger signal and the high-frequency signals, which originate from the part of the wheel electronic systems of the tires of the first tire set, which received the first trigger signal, contain information about the received first trigger signal.

The inventive method is intended in particular for measuring the tire pressure of the individual tires automatically and while the vehicle is traveling, so that a person steering the vehicle for example can be informed about the current tire pressure of the tires or the person can be reliably and automatically warned, if the tire pressure of one of the tires is too low. To this end generally known wheel electronic systems for example are associated with the tires, it being possible for these to be integrated in the tires for example. As well as a pressure sensor for measuring the tire pressure, the wheel electronic systems also have a transmitter, which is used to transmit the high-frequency signals to the first transmit/receive apparatus. If the inventive method is used to measure tire pressures, the high-frequency signals include a message relating to the currently measured tire pressure of the relevant tire.

According to the inventive method the first transmit/receive apparatus receives the high-frequency signals originating from the wheel electronic systems, these having for example a frequency higher than 200 MHz, e.g. approximately 315 MHz.

So that it is possible to distinguish the wheel electronic system from which the high-frequency signals originate, in other words to determine the mounting position of the relevant tire, according to the invention the first transmit/receive apparatus transmits the first trigger signal, the frequency of which is significantly lower than the frequency of the high-frequency signals. The frequency of the first trigger signal is for example lower than 200 kHz, for example approximately 125 kHz.

The wheel electronic systems are in principle embodied in such a manner that they can receive the trigger signal, in that the wheel electronic systems for example comprise a corresponding receiver. If a wheel electronic system receives the trigger signal, then according to the invention the high-frequency signal originating from this wheel electronic system contains information about the received trigger signal.

The receive range of the trigger signal is relatively small. According to the invention the level of the trigger signal and the arrangement of the transmit/receive apparatus relative to the mounted tires is selected in such a manner that only a predetermined part of the wheel electronic systems associated with the tires can receive the trigger signal. It is thus possible to conclude the mounting location of the tires based on an evaluation of the high-frequency signals.

According to one embodiment of the inventive method the following method steps are also performed: using a second transmit/receive apparatus disposed on the vehicle to receive high-frequency signals, which originate from wheel electronic systems, which interact with tires of a second tire set mounted on the vehicle, and using the second transmit/receive apparatus to transmit a second trigger signal, having a frequency which is significantly lower than the frequency of the high-frequency signals, the second transmit/receive apparatus being disposed on the vehicle in such a manner, the tires of the second tire set being mounted on the vehicle in such a manner and the level of the second trigger signal being selected in such a manner that only one part of the wheel electronic systems of the tires of the second tire set receives the second trigger signal and the high-frequency signals, which originate from the part of the wheel electronic systems of the tires of the second tire set, which received the second trigger signal, contain information about the received second trigger signal, and also the first and second transmit/receive apparatuses are disposed on the vehicle in such a manner and the tires of the first and second tire sets are mounted on the vehicle in such a manner that the first transmit/receive apparatus receives high-frequency signals originating from the wheel electronic systems of the tires of the first tire set at a significantly higher level than the high-frequency signals originating from the wheel electronic systems of the tires of the second tire set and/or the second transmit/receive apparatus receives high-frequency signals originating from the wheel electronic systems of the tires of the second tire set at a significantly higher level than the high-frequency signals originating from the wheel electronic systems of the tires of the first tire set.

According to this variant of the inventive method the vehicle has a number of transmit/receive apparatuses and a number of tire sets. Due to the arrangements of the transmit/ receive apparatuses in the vehicle the first transmit/receive apparatus receives the high-frequency signals originating from the wheel electronic systems of the tires of the first tire set at a significantly higher level than the high-frequency signals originating from the tires of the second tire set. It should also be understood in the following that due to its arrangement in the vehicle the first transmit/receive apparatus does not receive the high-frequency signals originating from the wheel electronic systems of the tires of the second tire set at all.

It is thus possible, based on an evaluation of the levels of the received high-frequency signals in combination with in some instances information about a received trigger signal, to draw a conclusion about the mounting location of the tires on the vehicle.

The high frequency signals can also contain information about the tire, from which the relevant high-frequency signal originates. Such information is an individual identification number for example.

According to one variant of the inventive method the vehicle is a truck with at least two rear axles and the tires of the first tire set are mounted on the two rear axles either on the driver or passenger side. It is possible with the inventive method to determine the relevant rear axle as the mounting location for example.

According to a further variant of the inventive method the tires of the first tire set are mounted on the two rear axles on the driver side and the tires of the second tire set are mounted on the two rear axles on the passenger side. The two transmit/receive apparatuses mean that it is then not only possible to determine the relevant rear axle of a specific tire but also the relevant side of the truck.

According to one embodiment of the inventive method the vehicle has a front axle and a rear axle, with tires mounted on the front axle forming the first tire set and the tires mounted on the rear axle forming the second tire set, the first transmit/receive apparatus being disposed in proximity to a first wheel housing of the vehicle, which is associated with one of the tires of the first tire set, and the second transmit/receive apparatus being disposed in proximity to a second wheel housing of the vehicle, which is associated with one of the tires of the second tire set. It is therefore possible based on the levels of the received high-frequency signals to associate the tires with the front or rear axle. The trigger signals allow a driver/passenger side association.

The first and second wheel housings can be located on the vehicle in particular diagonally in relation to the longitudinal axis of the vehicle.

The object of the invention is also achieved by an apparatus for locating tires mounted on a vehicle, having first and second transmit/receive apparatuses disposed on the vehicle, which are set up to receive high-frequency signals originating from wheel electronic systems disposed on the vehicle and to transmit trigger signals to the wheel electronic systems, the frequency of which is significantly lower than the frequency of the high-frequency signals, the wheel electronic systems interacting with tires mounted on the vehicle, a first part of the tires forming a first tire set and a second part of the tires, which is different from the first part, forming a second tire set, the first transmit/receive apparatus being associated with the first tire set and the second transmit/receive apparatus being associated with the second tire set, the tires of the first and second tire sets being mounted on the vehicle in such a manner and the two transmit/receive apparatuses being disposed on the vehicle in such a manner that the first transmit/receive apparatus receives high-frequency signals originating from the wheel electronic systems of the tires of the first tire set at a significantly higher level than the high-frequency signals originating from the wheel electronic systems of the tires of the second tire set, the second transmit/receive apparatus receives high-frequency signals originating from the wheel electronic systems of the tires of the second tire set at a significantly higher level than the high-frequency signals originating from the wheel electronic systems of the tires of the first tire set, the level of the trigger signal of the first transmit/receive apparatus being selected in such a manner that only one part of the wheel electronic systems of the tires of the first tire set receives this trigger signal, the level of the trigger signal of the second transmit/receive apparatus being selected in such a manner that only one part of the wheel electronic systems of the tires of the second tire set receives this trigger signal and the high-frequency signals, which originate from the wheel electronic systems of the tires which received a trigger signal, containing information about the received trigger signal.

The frequency of the trigger signals can be lower than 200 kHz for example and the frequency of the high-frequency signals can be higher than 200 MHz for example. The high-frequency signals can contain information about the tire from which the relevant high-frequency signal originates.

The vehicle can in particular be a truck with at least two rear axles, with the tires of the first tire set being mounted on the two rear axles on the driver side and the tires of the second tire set being mounted on the two rear axles on the passenger side.

The vehicle can have a front axle and a rear axle, with tires mounted on the front axle forming the first tire set and the tires mounted on the rear axle forming the second tire set, the first transmit/receive apparatus being disposed in proximity to a first wheel housing of the vehicle, which is associated with one of the tires of the first tire set, and the second transmit/receive apparatus being disposed in proximity to a second wheel housing of the vehicle, which is associated with one of the tires of the second tire set. The first and second wheel housings are located on the vehicle in particular diagonally in relation to the longitudinal axis of the vehicle.

Exemplary embodiments of the invention are shown by way of example in the accompanying schematic drawings, in which:

DESCRIPTION OF THE INVENTION

Figure 1:
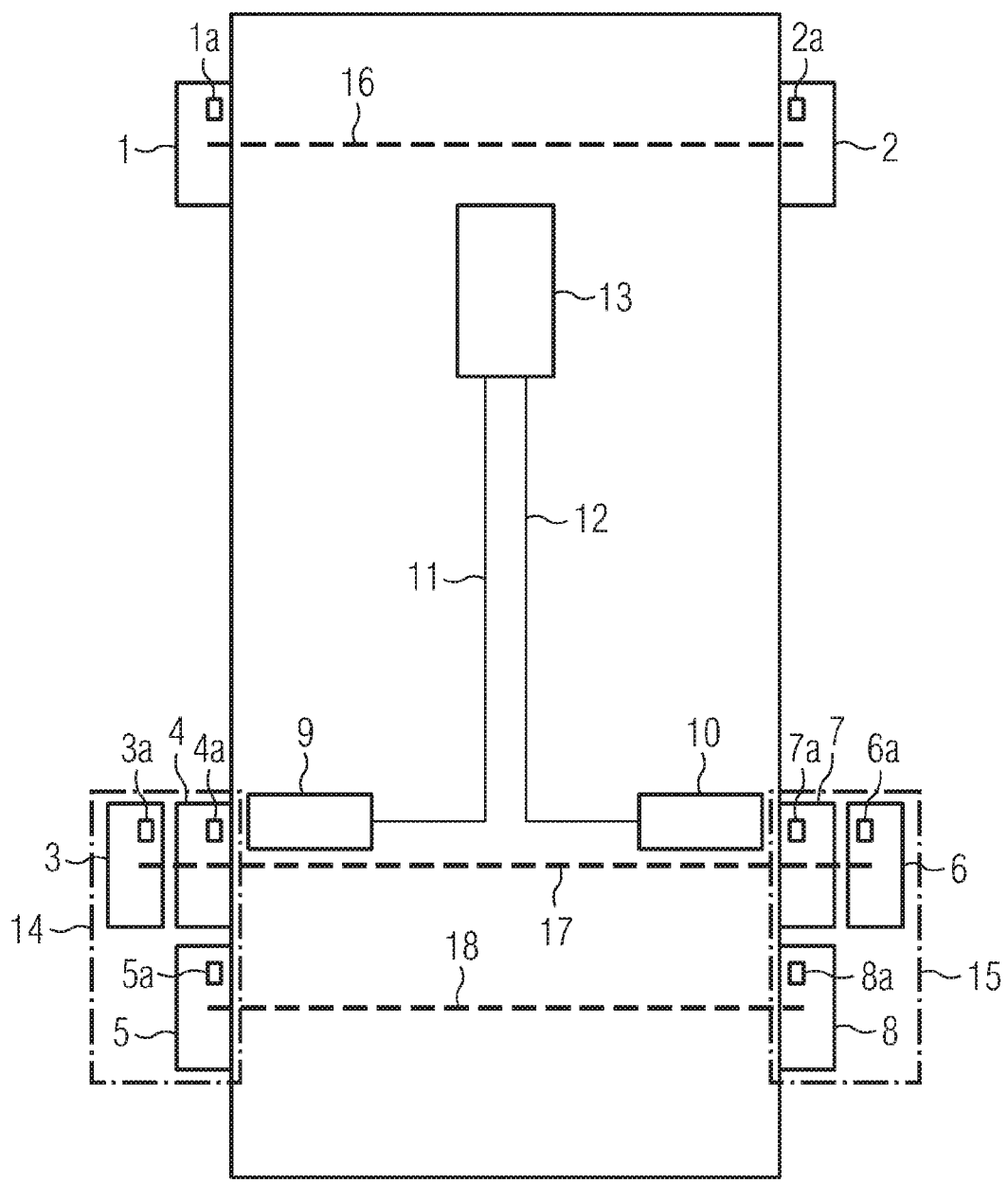
FIG. 1 shows a plan view of a truck.

FIG. 1 shows a schematic diagram of a plan view of a truck (HGV) as an example of a vehicle.

In the case of the present exemplary embodiment the HGV has a front axle 16, on which two front wheels with tires 1, 2 are mounted, a first rear axle 17, on which four rear wheels with tires 3, 4, 6, 7 are mounted and a second rear axle 18, on which two rear wheels 5, 8 are mounted. Three of the rear wheels respectively form a wheel set, with the rear wheels of the tires 3-5 forming a first wheel set and/or the tires 3-5 forming a first tire set 14 and the rear wheels of the tires 6-8 forming a second wheel set and/or the tires 6-8 forming a second tire set 15. The tires 3, 4 and the tires 6, 7 are twin tires respectively.

Figure 2:
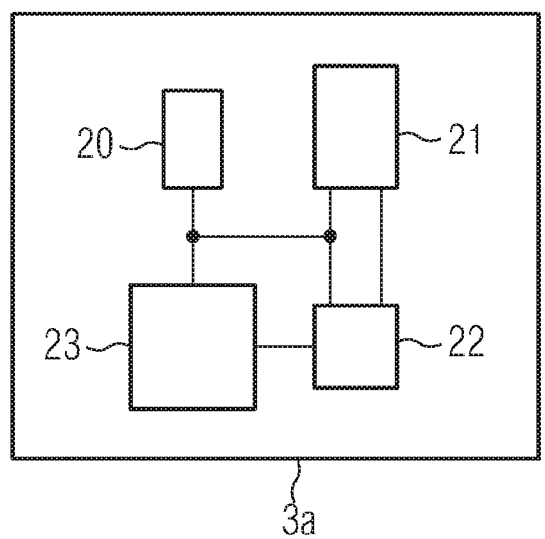
FIG. 2 shows a wheel electronic system of one of the tires of the truck.

A wheel electronic system 1a-8a (shown in more detail in FIG. 2) is associated respectively with the tires 1-8, to measure parameters of the respective tire 1-8 automatically, for example its tire pressure. The wheel electronic systems 1a-8a are secured for example in the generally known manner to the rims of the front and rear wheels and are in contact with their tires 1-8. Alternatively the wheel electronic systems 1a-8a can also be integrated in their associated tires 108.

In the case of the present exemplary embodiment the wheel electronic systems 1a-8a have a tire pressure measuring apparatus 21, a processing apparatus 22 connected to the tire pressure measuring apparatus 21 and a transmitter/receiver 23 connected to the processing apparatus 22, each being supplied with electrical energy from an energy source 20, e.g. a battery, an energy generator or even by telemetry. The wheel electronic systems 1a-8a are provided to measure the current tire pressure of the corresponding tire 1-8 by means of the relevant tire pressure measuring apparatuses 21. The processing apparatus 22 is provided among other things to generate a message containing information about the current tire pressure and identification of the respective tire 1-8, e.g. an identification number associated with the respective tire. The message is then sent using the transmitter/receiver 23 by means of a high-frequency signal, which in the case of the present exemplary embodiment has a frequency higher than 200 MHz, in particular around 315 MHz. When the HGV starts up, the wheel electronic systems 1a-8a transmit the message at shorter intervals for example than when the HGV has been traveling for quite a long period.

Figure 3:
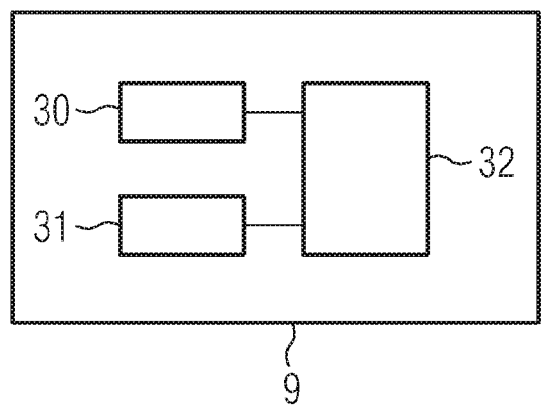
FIG. 3 shows a receive/transmit apparatus of the truck.

In the case of the present exemplary embodiment the HGV also has two essentially identically structured receive/transmit apparatuses 9, 10, of which the receive/transmit apparatus 9 is shown in more detail in FIG. 3, and an evaluation apparatus 13 connected to the receive/transmit apparatuses 9, 10 by means of electrical lines 11, 12. The transmit/receive apparatuses 9, 10 and the evaluation apparatus 13 are supplied with electrical energy in a manner not shown.

The receive/transmit apparatuses 9, 10 each have for example a transmitter 30, a receiver 31 and a control apparatus 32 connected to the evaluation apparatus 13, as shown in FIG. 3. The control apparatus 32 is realized for example by means of a microcontroller and in the case of the present exemplary embodiment an antenna (not shown in more detail) is integrated respectively in the transmitter 30 and in the receiver 31.

The receivers 31 of the receive/transmit apparatuses 9, 10 are provided to receive the high-frequency signals transmitted by the wheel electronic systems 3a-8a, to decode the corresponding messages and to forward the measured tire pressures with the associated identification numbers to the evaluation apparatus 13.

In the case of the present exemplary embodiment a computer program runs on the evaluation apparatus 13, comparing the currently measured tire pressures with setpoint tire pressures and, if a tire pressure drops below a setpoint tire pressure, informing a person (not shown) steering the HGV of the low value of the tire pressure by means of a display (also not shown in detail). It is however also possible for this information to be stored in the evaluation apparatus 13 for example, to be read out for example by a service operator, so that the relevant tire is replaced for example. It is also possible to transmit this information to a central computer, which is associated with the operator of the HGV.

So that if the tire pressure of one of the tires 1-8 has a low value, information about the relevant tire 1-8 can be displayed, in the case of the present exemplary embodiment the transmit/receive apparatus 9 is secured in situ in the HGV and close enough to the tires 3-5 of the first tire set 14, so that the receiver 31 of the receive/transmit apparatus 9 can receive the high-frequency signals of the wheel electronic systems 3a-5a of the tires 3-5 of the first tire set 14 at an adequate level. The receive/transmit apparatus 9 is also secured in the HGV in such a manner that its receiver 31 can receive the high-frequency signals of the wheel electronic systems 1a, 2a, 6a-8a of the remaining tires 1, 2, 6-8 if only at a significantly lower level. It is thus possible, if the receive/transmit apparatus 9 receives messages about tire pressures, for these to be able to be associated with the tires 3-5 of the first tire set 14.

In the case of the present exemplary embodiment the receive/transmit apparatus 10 is associated with the tires 6-8 of the second tire set 15 and is secured in situ in the HGV and close enough to the tires 6-8 of the second tire set 15, so that the receiver 31 of the receive/transmit apparatus 10 can receive the high-frequency signals of the wheel electronic systems 6a-8a of the tires 6-8 of the second tire set 15 at an adequate level but can receive the high-frequency signals of the remaining wheel electronic systems 1a-5a of the remaining tires 1-5 if only at a significantly lower level. It is thus possible, if the receive/transmit apparatus 10 receives messages about tire pressures, for these to be able to be associated with the tires 6-8 of the second tire set 15. The tire pressures of the tires 1, 2 of the front wheels are monitored with a monitoring apparatus (not shown in more detail), the output signals of which are also transmitted to the evaluation apparatus 13.

Based on the high-frequency signals the evaluation apparatus 13 or the computer program running on the evaluation apparatus 13 can decide whether a too low tire pressure that may occur should be associated with one of the tires of the first tire set 14, one of the tires of the second tire set 15 or the tires 1, 2 of the front wheels.

The receive/transmit apparatuses 9, 10 are also embodied in such a manner that their transmitters 30 transmit a trigger signal for example at periodic intervals. The transmitters 30 transmit their trigger signals at a frequency which is significantly lower than the frequency of the high-frequency signals and in the case of the present exemplary embodiment is lower than 200 kHz and is in particular 125 kHz. The trigger signals are intended for the transmitter/receivers 23 of the tire pressure electronic systems 3a-8a. If one of the transmitter/receivers 23 receives a trigger signal, information about the received trigger signal is added to the message generated by the corresponding wheel electronic system 3a-8a, which the receiver 31 of the relevant receive/transmit apparatus 9, 10 also forwards to the evaluation apparatus 13.

The trigger signals have a relatively low frequency but it is possible to set their level in such a manner that the range of the trigger signals can be set relatively precisely. Also in the case of the present exemplary embodiment the receive/transmit apparatus 9 is disposed in the HGV in such a manner that its transmitter 30 is relatively close to the tires 3, 4 representing twin tires and relatively far away from the tire 5 of the first tire set 14. Therefore only the wheel electronic systems 3a, 4a associated with the twin tires of the first tire set 14 receive the trigger signal transmitted by the receive/transmit apparatus 9. The remaining wheel electronic systems and in particular the wheel electronic system 5a of the tire 5 of the first tire set 14 in contrast generally receive no trigger signal. Therefore only the messages originating from the twin tires (tires 3, 4) contain information about a trigger signal transmitted by the receive/transmit apparatus 9, so that the measured tire pressures can also be associated with the axles on which the corresponding tires are mounted.

The receive/transmit apparatus 10 associated with the second tire set 15 also transmits trigger signals at the relatively low frequency. The receive/transmit apparatus 10 here is disposed in the HGV in such a manner and the level of the trigger signals is set in such a manner that only the transmitter/receivers 23 of the wheel electronic systems 6a, 7a receive the trigger signals.

It is thus possible to determine the mounting locations of the tires 1-8 based on triggering and the high-frequency signals. It is therefore also possible to inform the person steering the HGV not only about the tire pressures of the tires 1-8 or a low value of a tire pressure but also to specify information about the mounting location of the relevant tires 1-8. In other words it is also possible to specify the axle on which the relevant tire 3-8 is mounted and whether the relevant tire 3-8 is on the driver side or passenger side.

Figure 4:
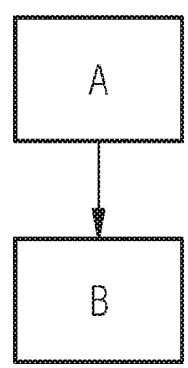
FIG. 4 shows a flow diagram to illustrate the inventive method.

FIG. 4 illustrates the inventive method. The transmit/receive apparatuses 9, 10 receive high-frequency signals, which originate from the receivers 31 of the wheel electronic systems 3a-8a. Based on the levels of the high-frequency signals the transmit/receive apparatus 9 only takes into account the high-frequency signals originating from the tires 3-5 of the tire set 14, step A of the flow diagram.

Based on the trigger signals transmitted by the transmit/receive apparatuses 9, 10 the high-frequency signals associated with the tires 3, 4 and the tires 6, 7 also contain information about the received trigger signal, step B.

Figure 5:
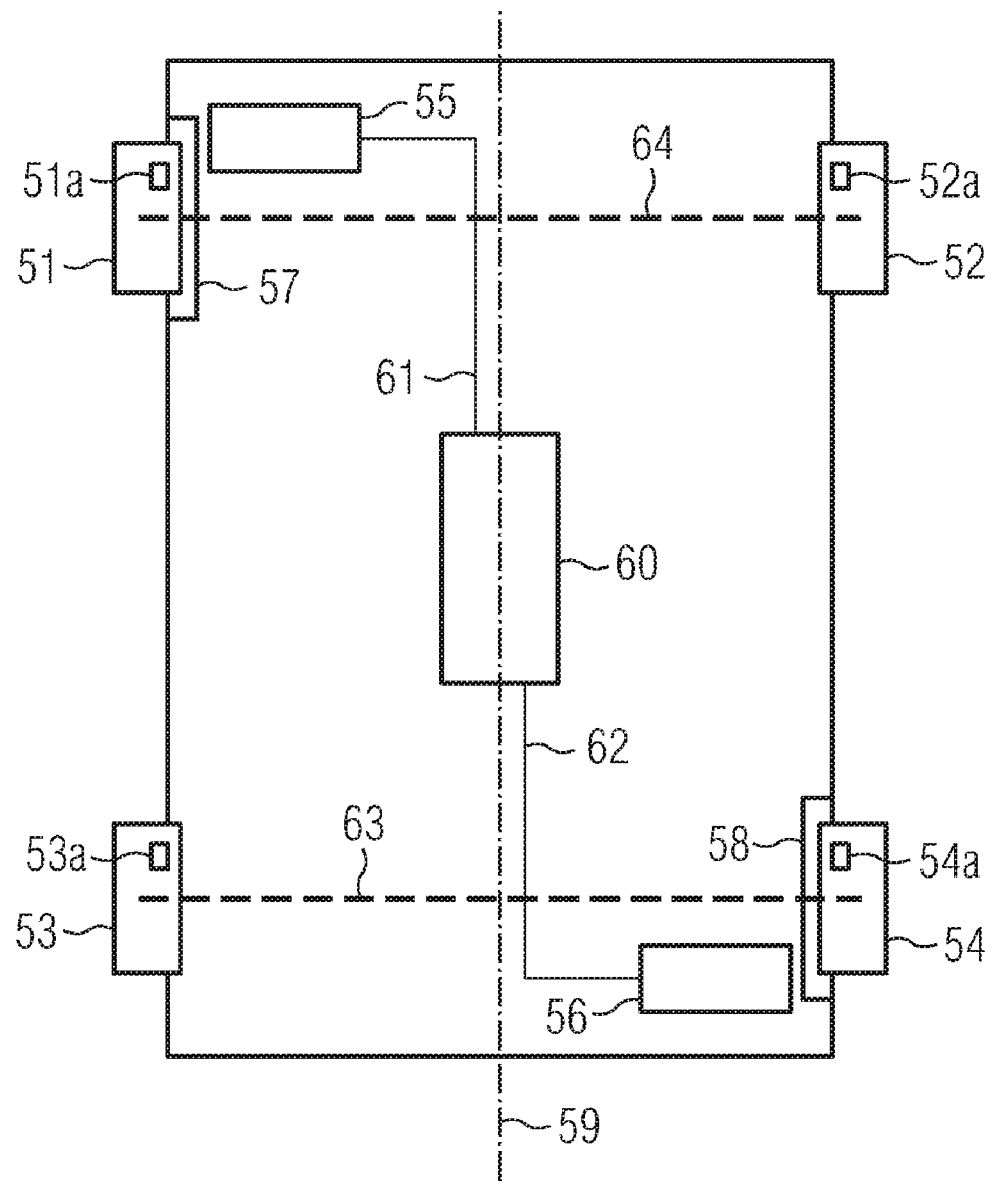
FIG. 5 shows a plan view of an automobile.

FIG. 5 shows a further exemplary embodiment in the form of a schematic diagram of a plan view of an automobile as a further example of a vehicle. Unless otherwise described below, components of the automobile shown in FIG. 5, which are largely identical in structure and function to the components of the HGV shown in FIG. 1, are shown with the same reference characters.

The automobile has a front axle 64, on which two front wheels with tires 51, 52 are mounted, and a rear axle 63, on which two rear wheels with tires 53, 54 are mounted. Wheel electronic systems 51a-54a are integrated respectively in the tires 51-54, being structured in a corresponding manner to the wheel electronic system 3a shown in FIG. 2. The automobile also has a first receive/transmit apparatus 55 and a second receive/transmit apparatus 56. The first receive/transmit apparatus 55 is secured in the front region of the automobile close to a wheel housing 57 associated with front wheel with the tire 51 and the second receive/transmit apparatus 56 is secured in the rear region of the automobile close to a wheel housing 58 associated with the rear wheel with the tire 54. In the case of the present exemplary embodiment the two receive/transmit apparatuses 55, 56 of the automobile are thus disposed diagonally in relation to the longitudinal axis 59 of the automobile.

The automobile also has an evaluation apparatus 60, which is connected with electrical lines 61, 62 to the receive/transmit apparatuses 55, 56 and corresponds essentially to the evaluation apparatus 13 of the HGV shown in FIG. 1.

The installation locations of the two receive/transmit apparatuses 55, 56 mean that the receiver 31 of the first receive/transmit apparatus 55 receives high-frequency signals transmitted by the wheel electronic systems 51a, 52a of the front wheels at a significantly higher level than high-frequency signals transmitted by the tire electronic systems 53a, 54a of the rear wheels. The receiver 31 of the second receive/transmit apparatus 56 in contrast receives high-frequency signals transmitted by the tire electronic systems 53a, 54a of the rear wheels at a significantly higher level than high-frequency signals transmitted by the tire electronic systems 51a, 52a of the front wheels.

Also the trigger signal with the relatively low frequency transmitted by the first receive/transmit apparatus 55 has such a range that it only reaches the tire electronic system 51a of the front wheel of the wheel housing 57, in other words the first receive/transmit apparatus 55 only triggers the tire electronic system 51a of the tire 51. The trigger signal with the relatively low frequency transmitted by the second receive/transmit apparatus 56 has such a range that it only reaches the tire electronic system 54a of the rear wheel of the wheel housing 58, in other words the second receive/transmit apparatus 56 only triggers the tire electronic system 54a of the tire 54. It is thus possible for the computer program running on the evaluation apparatus 60 to be able to associate the measured tire pressures with the individual wheels of the automobile.

In the cases of the present exemplary embodiments each tire of the HGV shown in FIG. 1 and/or the automobile shown in FIG. 5 can be identified based on its identification number. If the tires are mounted on the HGV and/or automobile, it may be that the evaluation apparatus 13, 60 or the receive/transmit apparatuses require the identification numbers of the mounted tires. In the described exemplary embodiments the evaluation apparatuses and/or the receive/transmit apparatuses obtain this information based on the messages of the high-frequency signals. Based on the triggering of only certain tires by means of the receive/transmit apparatuses it is also possible to obtain the precise mounting locations of the individual tires on the HGV and/or on the automobile, for example during an initialization process.

The invention claimed is:

1. A method for locating tires mounted on a vehicle, the method which comprises the following method steps:
   receiving, with a first transmit/receive apparatus disposed on a vehicle, high-frequency signals originating from wheel electronic systems disposed on the vehicle, the wheel electronic systems interacting with tires of a first tire set mounted on the vehicle; and
   transmitting a first trigger signal with the first transmit/receive apparatus, the first trigger signal having a frequency significantly lower than a frequency of the high-frequency signals;
   wherein:
      the first transmit/receive apparatus is disposed on the vehicle; and
      the tires of the first tire set are mounted on the vehicle; and
      a level of the first trigger signal is selected;
   such that only one part of the wheel electronic systems that is associated with the tires of the first tire set receives the first trigger signal and the high-frequency signals, which originate from the part of the wheel electronic systems of the tires of the first tire set, which received the first trigger signal, contain information about the received first trigger signal.

2. The method according to claim 1, wherein the frequency of the trigger signal is lower than 200 kHz and/or the frequency of the high-frequency signals is higher than 200 MHz.

3. The method according to claim 1, wherein the high-frequency signals contain information about the tires, from the wheel electronic system of which the relevant high-frequency signal originates.

4. The method according to claim 1, wherein the vehicle is a truck with a least two rear axles and the tires of the first tire set are mounted on the two rear axles either on a driver side or on a passenger side.

5. The method according to claim 1, which comprises:
receiving, with a second transmit/receive apparatus disposed on the vehicle, high-frequency signals originating from wheel electronic systems, the wheel electronic systems interacting with tires of a second tire set mounted on the vehicle; and
transmitting a second trigger signal with the second transmit/receive apparatus, the second trigger signal having a frequency which is significantly lower than the frequency of the high-frequency signals;
wherein:
the second transmit/receive apparatus is disposed on the vehicle; and
the tires of the second tire set are mounted on the vehicle; and
a level of the second trigger signal is selected;
such that only one part of the wheel electronic systems of the tires of the second tire set receives the second trigger signal and the high-frequency signals, which originate from the part of the wheel electronic systems of the tires of the second tire set, which received the second trigger signal, contain information about the received second trigger signal; and
wherein:
the first and second transmit/receive apparatuses are disposed on the vehicle; and
the tires of the first and second tire sets are mounted on the vehicle;
such that the first transmit/receive apparatus receives high-frequency signals originating from the wheel electronic systems of the tires of the first tire set at a significantly higher level than the high-frequency signals originating from the wheel electronic systems of the tires of the second tire set and/or the second transmit/receive apparatus receives high-frequency signals originating from the wheel electronic systems of the tires of the second tire set at a significantly higher level than the high-frequency signals originating from the wheel electronic systems of the tires of the first tire set.

6. The method according to claim 5, wherein the vehicle is a truck with at least two rear axles and the tires of the first tire set are mounted on the two rear axles on a driver side and the tires of the second tire set are mounted on the two rear axles on a passenger side.

7. The method according to claim 5, wherein the vehicle has a front axle and a rear axle, with tires mounted on the front axle forming the first tire set and tires mounted on the rear axle forming the second tire set, the first transmit/receive apparatus being disposed in proximity to a first wheel housing of the vehicle, which is associated with one of the tires of the first tire set, and the second transmit/receive apparatus being disposed in proximity to a second wheel housing of the vehicle, which is associated with one of the tires of the second tire set.

8. The method according to claim 7, wherein the first and second wheel housings are located on the vehicle diagonally in relation to the longitudinal axis of the vehicle.

9. An apparatus for locating tires mounted on a vehicle, comprising:
first and second transmit/receive apparatuses disposed on the vehicle, said transmit/receive apparatuses being configured to receive high-frequency signals originating from wheel electronic systems disposed on the vehicle and to transmit trigger signals to the wheel electronic systems, a frequency of which is significantly lower than a frequency of the high-frequency signals, the wheel electronic systems interacting with tires mounted on the vehicle, a first part of the tires forming a first tire set and a second part of the tires, which is different from the first part, forming a second tire set;
wherein said first transmit/receive apparatus is associated with the first tire set and said second transmit/receive apparatus is associated with the second tire set;
the tires of the first and second tire sets being disposed on the vehicle in such a manner and said first and second transmit/receive apparatuses being disposed on the vehicle in such a manner that said first transmit/receive apparatus receives high-frequency signals originating from the wheel electronic systems of the tires of the first tire set at a significantly higher level than the high-frequency signals originating from the wheel electronic systems of the tires of the second tire set, said second transmit/receive apparatus receives high-frequency signals originating from the wheel electronic systems of the tires of the second tire set at a significantly higher level than the high-frequency signals originating from the wheel electronic systems of the tires of the first tire set;
a level of the trigger signal of said first transmit/receive apparatus being selected in such a manner that only one part of the wheel electronic systems of the tires of the first tire set receives the trigger signal, a level of the trigger signal of the second transmit/receive apparatus being selected in such a manner that only one part of the wheel electronic systems of the tires of the second tire set receives the trigger signal originating from said second transmit/receive apparatus, and wherein the high-frequency signals, which originate from the wheel electronic systems of the tires which received a trigger signal, containing information about the received trigger signal.

10. The apparatus according to claim 9, wherein the frequency of the trigger signals is lower than 200 kHz and/or the frequency of the high-frequency signals is higher than 200 MHz.

11. The apparatus according to claim 9, wherein the high-frequency signals contain information about the tire, from which the relevant high-frequency signal originates.

12. The apparatus according to claim 9, wherein the vehicle is a truck with at least two rear axles and the tires of the first tire set are mounted on the two rear axles on a driver side and the tires of the second tire set are mounted on the two rear axles on a passenger side.

13. The apparatus according to claim 9, wherein the vehicle has a front axle and a rear axle, with tires mounted on the front axle forming the first tire set and the tires mounted on the rear axle forming the second tire set, the first transmit/receive apparatus being disposed in proximity to a first wheel housing of the vehicle, which is associated with one of the tires of the first tire set, and the second transmit/receive apparatus being disposed in proximity to a second wheel housing of the vehicle, which is associated with one of the tires of the second tire set.

14. The apparatus according to claim 13, wherein the first and second wheel housings are located on the vehicle diagonally from one another in relation to a longitudinal axis of the vehicle.

* * * * *